(12) United States Patent
Fluch et al.

(10) Patent No.: US 11,090,920 B2
(45) Date of Patent: Aug. 17, 2021

(54) CONTINUOUS STRIP METHOD FOR PRODUCING AN ELECTRIC STRIP LAMINATE WHICH IS WOUND AS A COIL

(71) Applicant: VOESTALPINE STAHL GMBH, Linz (AT)

(72) Inventors: Ronald Fluch, Linz (AT); Carina Kern, Linz (AT)

(73) Assignee: voestalpine Stahl GmbH, Linz (AT)

( * ) Notice: Subject to any disclaimer, the term of this patent is extended or adjusted under 35 U.S.C. 154(b) by 226 days.

(21) Appl. No.: 15/998,826

(22) PCT Filed: Feb. 15, 2017

(86) PCT No.: PCT/EP2017/053440
§ 371 (c)(1),
(2) Date: Apr. 17, 2019

(87) PCT Pub. No.: WO2017/140747
PCT Pub. Date: Aug. 24, 2017

(65) Prior Publication Data
US 2019/0366699 A1 Dec. 5, 2019

(30) Foreign Application Priority Data

Feb. 15, 2016 (EP) .................................. 16155764

(51) Int. Cl.
*H01F 41/06* (2016.01)
*B32B 37/12* (2006.01)
*H01F 41/12* (2006.01)

(52) U.S. Cl.
CPC ......... *B32B 37/1207* (2013.01); *H01F 41/06* (2013.01); *H01F 41/12* (2013.01); *B32B 2037/1215* (2013.01); *B32B 2309/02* (2013.01)

(58) Field of Classification Search
CPC ........ B32B 37/1207; B32B 2037/1215; B32B 2309/02; B32B 2037/1223;
(Continued)

(56) References Cited

U.S. PATENT DOCUMENTS 4,053,682 A * 10/1977 Donermeyer .......... C09J 177/12
428/460
4,304,697 A * 12/1981 Agarwal ................ C09J 123/32
524/399

(Continued)

FOREIGN PATENT DOCUMENTS

| CN | 100579776 C | 1/2010 |
| CN | 102963102 A | 3/2013 |

(Continued)

OTHER PUBLICATIONS

Machine Translation of Japanese Patent 4-12844, Date Unknown.*

*Primary Examiner* — Jeffry H Aftergut

(57) ABSTRACT

A continuous strip method for producing an electric strip laminate which is wound into a coil is proposed in which at least two electric strips are pressed against each other on their flat sides and are integrally bonded to form an electric strip laminate and in a further step, this electric strip laminate is wound into a coil. More particularly, a first electric strip is coated on at least one of its flat sides with a first thermally activatable hot melt adhesive lacquer, the first hot melt adhesive lacquer on the first electric strip is thermally activated, and then the electric strips are pressed against each other on their flat sides with the activated first hot melt adhesive lacquer layer between these flat sides and a second electric strip is supplied to this pressing process at a temperature below the activation temperature of the first hot melt adhesive lacquer layer on the first electric strip.

18 Claims, 3 Drawing Sheets

(58) Field of Classification Search
CPC ... B32B 2307/202; B32B 37/10; H01F 41/06; H01F 41/12; H01F 41/0233; H01F 1/14783; H01F 3/02
See application file for complete search history.

(56) References Cited

U.S. PATENT DOCUMENTS

| | | | | |
|---|---|---|---|---|
| 4,310,457 A | * | 1/1982 | Agarwal | ............... C09J 109/00 |
| | | | | 524/399 |
| 4,338,229 A | * | 7/1982 | Agarwal | ............... C09J 123/32 |
| | | | | 524/399 |
| 5,851,342 A | * | 12/1998 | Vydra | ................ B32B 37/1207 |
| | | | | 156/324 |
| 10,391,741 B2 | | 8/2019 | Fluch | |
| 10,449,723 B2 | * | 10/2019 | Patberg | .................. B32B 27/16 |

FOREIGN PATENT DOCUMENTS

| | | |
|---|---|---|
| CN | 103770432 A | 5/2014 |
| DE | 102012001744 A1 | 8/2013 |
| JP | H01188331 A | 7/1989 |
| JP | H03142234 A | 6/1991 |
| JP | 4-12844 A * | 1/1992 |
| WO | 2007116047 A1 | 10/2007 |
| WO | 2015022275 A1 | 2/2015 |

\* cited by examiner

US 11,090,920 B2

CONTINUOUS STRIP METHOD FOR PRODUCING AN ELECTRIC STRIP LAMINATE WHICH IS WOUND AS A COIL

FIELD OF THE INVENTION

The invention relates to a continuous strip method for producing an electric strip laminate which is wound into a coil, in which at least one first electric strip and one second electric strip are pressed against each other on their flat sides and are integrally bonded to form an electric strip laminate and in a further step, this electric strip laminate is wound into a coil.

DESCRIPTION OF THE PRIOR ART

In order to be able to produce an electric strip laminate quickly, a continuous strip method has been disclosed in the prior art (WO2007/116047A1) in which three electric strips that are optionally coated with an insulating lacquer are integrally bonded. To this end, an adhesive is applied to both of the flat sides of the middle electric strip, then the three electric strips are pressed together and the electric strip laminate produced from these electric strips is wound into a coil. Disadvantageously, such a coating with adhesive in the continuous strip method must be performed in a comparatively careful way not only to produce a stable electric strip laminate, but also in order to insure the coil stability of the wound, electric strip laminate. For this coil stability, it is also necessary to insure that the applied adhesive is sufficiently cross-linked before the electric strip laminate is wound. This degree of cross-linking, however, is negatively affected to a not insignificant degree by parameter fluctuations in the continuous strip method (e.g.: strip speed, adhesive application), which jeopardizes the reproducibility of the continuous strip method, particularly if comparatively high strip speeds are required.

SUMMARY OF THE INVENTION

The object of the invention, therefore, is to modify a continuous strip method of the type described at the beginning such that despite comparatively high strip speeds, a high, reproducibility can be achieved.

The invention attains the stated object in that a first electric strip is provided, which is coated on at least one of its flat sides with a first thermally activatable hot melt adhesive lacquer, the first hot melt adhesive lacquer on the first electric strip is thermally activated, and then the electric, strips are pressed against, each other on their flat sides with the activated first hot melt adhesive lacquer layer between these flat sides and the second electric strip is supplied to this pressing process at a temperature below the activation temperature of the first hot melt adhesive lacquer layer on the first electric strip.

If a first electric strip is provided, which is coated on at least one of its flat sides with a first thermally activatable hot melt adhesive lacquer, and if the first hot melt adhesive lacquer on the first electric strip is thermally activated and the electric strips are then pressed against each other on their flat sides with the activated first hot melt adhesive lacquer layer between these flat sides, then the continuous strip method according to the invention can be embodied in a way that is considerably more resilient in the event of parameter fluctuations. It is thus possible, for example, to forego applying adhesive in the continuous strip method, which avoids layer thickness fluctuations due to parameter fluctuations, and to thus meet the requirements for a stable integral bonding in the continuous strip method. Consequently, it can also be sufficient to press the electric strips against each other on their flat sides, with the activated first hot melt adhesive lacquer layer between these flat sides, thus making it possible to achieve comparatively high strip speeds. This makes it possible to achieve a rapid, but reproducible continuous strip method.

If in addition, the second electric strip is supplied to this pressing process at a temperature below the activation temperature of the first hot melt adhesive lacquer layer on the first electric strip, then such an integral bonding of electric strips that are at different temperatures can significantly shorten the cooling phase of the electric strip laminate after the bonding. This can, for example, insure that before the winding of the electric strip laminate, the integral bonding between the electric strips is sufficiently strong so that it is possible to prevent an incorrect winding of the coil, Despite high strip travel speeds, the method according to the invention can nevertheless have a high reproducibility. In addition, this can reduce the energy expenditure of the continuous strip method since an active cooling does not necessarily have to be provided in the strip passage.

In general, it should be noted that "hot melt adhesive lacquer" can be understood, for example, to mean polyvinyl butyral-based baking lacquer, polyamides, modified polyamides, modified polyesters, or based on epoxy resin. In general, it should also be noted that "thermal activation of the hot melt adhesive lacquer" can be understood to mean both a liquefaction of a thermoplastic adhesive layer and a chemical cross-linking of the layers. It should also be noted that a "coil" can be understood to mean a wound strip or laminate.

If the second electric strip is supplied to the pressing process at the ambient temperature, then this can lead to the rapid temperature decrease in the electric strip laminate, which can speed up the continuous strip method. In addition, this rapid cooling can also foster an abrupt phase transformation in the activated first hot melt adhesive lacquer layer, which can improve the integral bonding and thus make the continuous strip method more reliable. In, addition, it is advantageously possible to eliminate an active heating of the second electric strip. It can be advantageous if this ambient temperature lies in the range from 10 to 75° C. (degrees Celsius).

If the first electric strip is supplied to the pressing process heated at least to the activation temperature of the first hot melt adhesive lacquer layer, then the thermal activation of the first hot melt adhesive lacquer layer can take place indirectly with the aid of the strip heating. It is thus possible to reliably avoid a local overheating of the hot melt adhesive lacquer layer that is to be activated and thus a destruction of the adhesive properties. This permits more reliable use, of the continuous strip method according to the invention.

The continuous strip method can also be embodied as more efficient and more rapid if the first hot melt adhesive lacquer of the electric strip is heated to 150 to 200° C. (degrees Celsius) and is thus thermally activated. This also makes it possible to insure that the temperature of the first hot melt adhesive lacquer layer is sufficiently high to thermally activate the first hot melt adhesive lacquer and, during the pressing process, to thermally activate the second hot melt adhesive lacquer layer if such a layer is provided on the second electric strip.

If the second electric strip is provided with a flat side that is coated with a second thermally activatable hot melt adhesive lacquer and if, when the electric strips are pressed together, the second hot melt adhesive lacquer layer is situated on the flat side of the second electric strip that faces away from the flat side of the first electric strip with the activated hot melt adhesive lacquer layer, then the comparatively high specific heat capacity of the second electric strip can reliably protect the second hot melt adhesive lacquer layer from being activated. Because of the comparatively rapid temperature equalization between these electric strips, it is specifically possible to avoid having the temperate of the hot melt adhesive lacquer layer on the second electric strip exceed its activation temperature. It is thus possible to insure that this hot melt adhesive lacquer layer remains activatable for the subsequent processing of the electric strip laminate and thus remains functional in this regard. The electric strip laminate can therefore be subsequently used in the same way that is known for electric strips with a hot melt adhesive lacquer layer.

In order to insure the rapid cooling of the electric strip laminate after the pressing process, the first activated hot melt adhesive lacquer layer can be pressed against the adhesive-free flat side of the second electric strip. In addition, this can lead to an abrupt phase transition in the hot melt adhesive lacquer layer, which can insure a rapid and reliable solidification of the bond. This can further increase the reproducibility of the continuous strip method.

The integral bonding between the electric strips can be improved if the flat side of the second electric strip is chemically pretreated and the first activated hot melt adhesive lacquer layer is pressed against this pretreated flat side of the second electric strip. Such a chemical pretreatment can, for example, forma conversion layer in order to thus improve the bonding of the activated hot melt adhesive lacquer layer. Such a pretreatment can be particularly advantageous if, during the pressing together of the two electric strips, there is a comparatively high temperature difference between the electric strips and the activated hot melt adhesive lacquer layer must set comparatively quickly. With the aid of the pretreated layer, however, a sufficient integral bonding can be insured between the hot melt adhesive lacquer layer and the pretreated flat side of the second electric strip, which can foster the reproducibility of the continuous strip method.

If the second electric strip likewise has a hot melt adhesive lacquer layer on the flat side that faces the first electric strip, which is thermally activated by the temperature of the first hot melt adhesive lacquer layer, then it is possible to achieve a particularly homogeneous melting of the hot melt adhesive lacquer layers on both of the electric strips—this makes it possible to improve the integral bonding further, thus enabling a further increase in the reproducibility of the continuous strip method.

If on its flat side that faces the first electric strip, the hot melt adhesive lacquer layer of the second electric strip is thermally activated during the pressing process, then in the first place, this can further simplify the operation of the continuous strip method since the continuous strip method does not require any additional measures for activating the second hot melt adhesive lacquer layer. In addition, it is thus possible to insure that the hot melt adhesive lacquer layer is thermally activated for only a comparatively short period of time, which can foster the rapid cooling of the electric strip laminate after the electric strips are pressed together.

The electric insulation between the electric strips can be increased if on the flat sides of the electric strips that face each other, the hot melt adhesive lacquer layers are supplied with fillers that have a particle size of 1 to 5 µm. This can also improve the mechanical strength of the electric strip laminate.

If as the electric strips are being pressed together, they are acted on, by a compressive load of at least 17 N/cm, for example through the use of pressing rollers, then this can insure the integral bonding between the electric strips and thus further improve the reproducibility of the continuous strip method in, the production of a stable electric strip laminate.

The continuous strip method according to the invention can particularly feature the fact that baking lacquer is used as the hot melt adhesive lacquer. Preferably, an epoxy resin-based baking lacquer can prove valuable for this purpose. It should also generally be noted that the activation temperature of the hot melt adhesive lacquers can be the same and/or the hot melt adhesive lacquers of the electric strips can be the same.

BRIEF DESCRIPTION OF THE DRAWINGS

The subject of the invention is shown by way of example in the figures using embodiment variants. In the drawings.

DETAILED DESCRIPTION OF THE PREFERRED EMBODIMENTS

Figure 1:
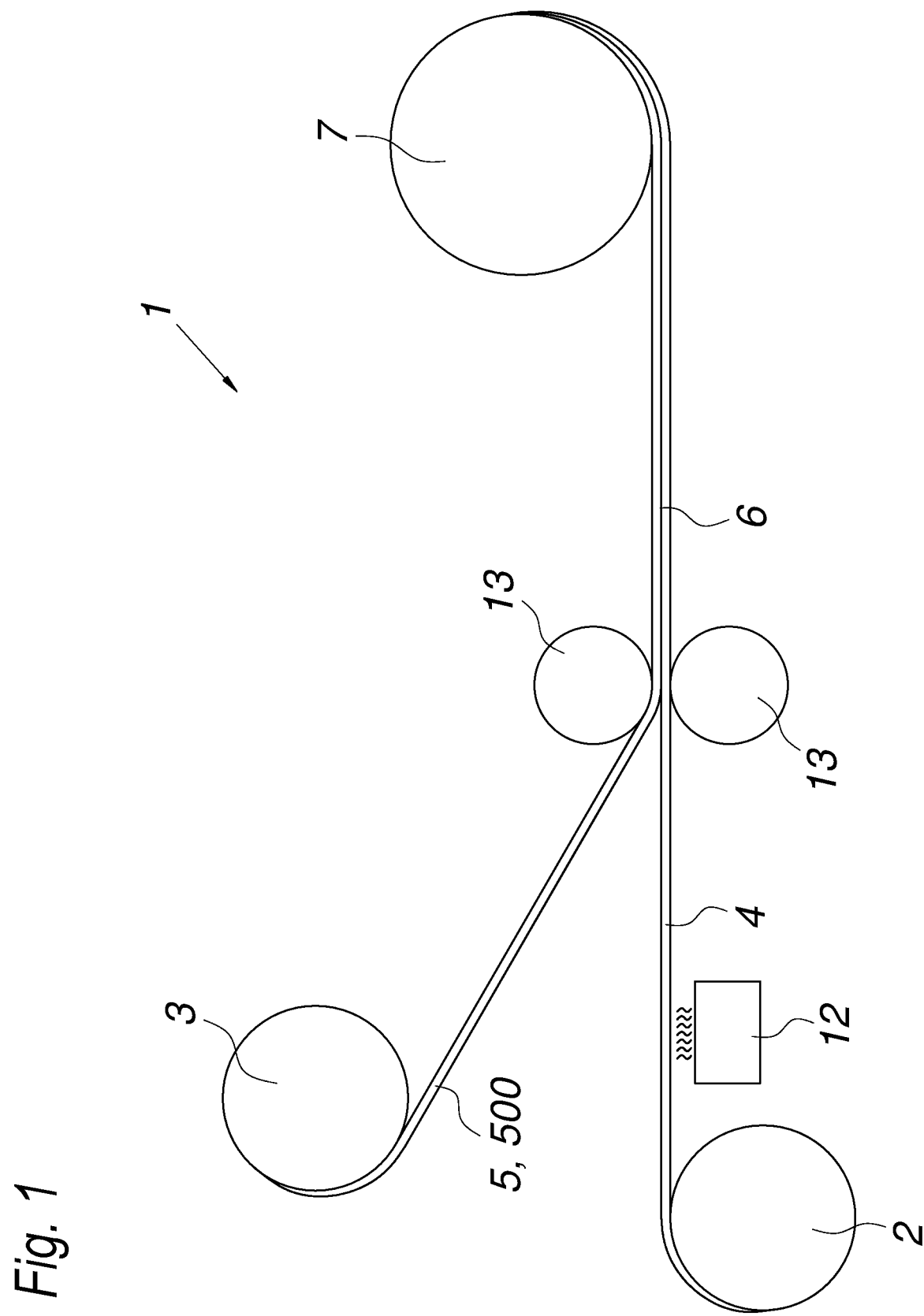
FIG. 1 shows a schematic view of an apparatus for producing an electric strip laminate that is composed of two electric strips and is wound into a coil and FIGS. 2 and 3 show detail views of the apparatus according to FIG. 1 with different electric strips.

According to the continuous strip method 1 schematically depicted in FIG. 1, it is clear that an electric strip 4, 5, 500 is unwound from two coils 2, 3.

Figure 2:
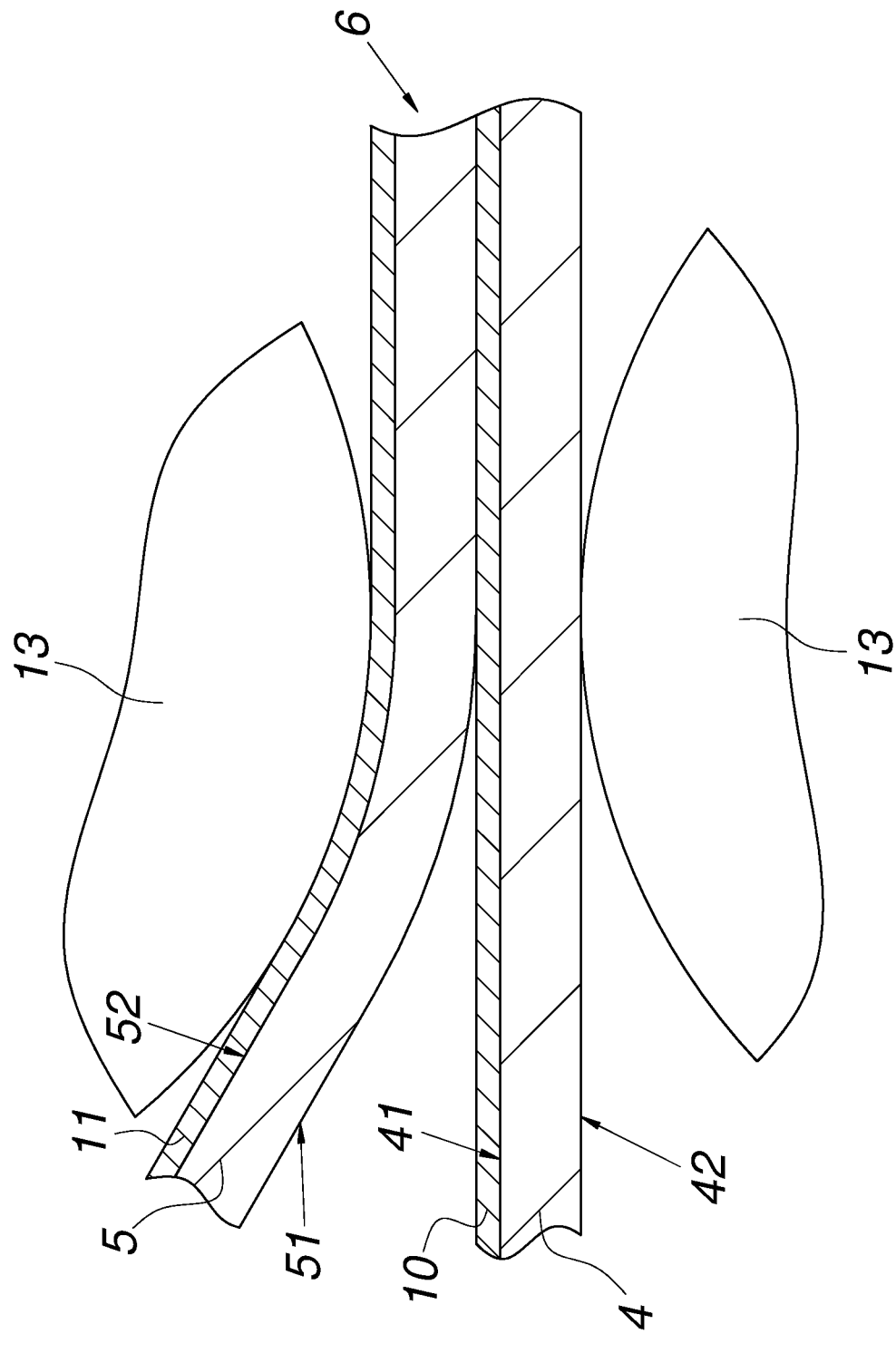

FIG. 2 shows that the electric strips 4, 5 each have two flat sides 41, 42 and 51, 52 the flat sides 41 and 51 of the first and second electric strip 4, 5 face each other. The first electric strip 4 is then integrally bonded to the second electric strip 5 to form an electric strip laminate 6 and the bonded electric strip laminate 6 is then wound into a coil 7.

Figure 3:
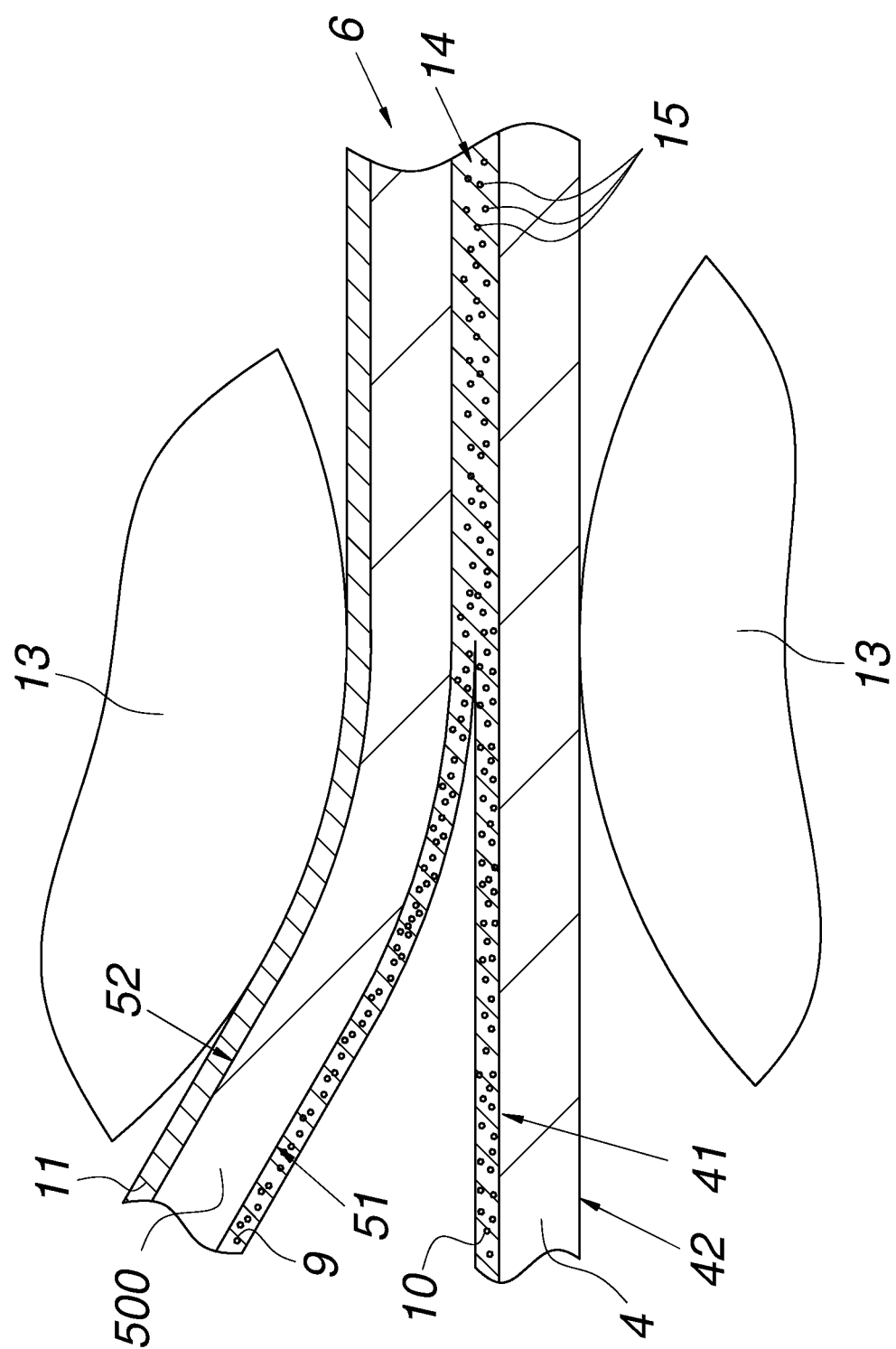

A comparatively high reproducibility in the continuous strip method 1 according to the invention is achieved in that, as depicted in detail in FIGS. 2 and 3, the first electric strip 4 has a hot melt adhesive lacquer layer 10 on its flat side 41 or a first electric strip 4 that is coated with a first thermally activatable hot melt adhesive lacquer 10 on at least one of its flat sides 41, 42 is supplied for the continuous strip method 1. The integral bonding of the electric strips 4, 5, 500 then needs only for the first hot melt adhesive lacquer 10 of the electric strip 4 to be thermally activated and then the electric strips 4, 5 are pressed together on their flat sides 41, 51 with the activated hot melt adhesive lacquer layer 10 between these flat sides 41, 51, which permits comparatively high strip speeds in the continuous strip method 1 thanks to the simple operability. Since the second electric strip 5, 500 is supplied to the pressing process at a temperature below the activation temperature of the first hot melt adhesive lacquer layer 10 on the first electric strip 4, it is possible not only to accelerate the cooling of the electric strip laminate 6, but also for the integral bonding to be cross-linked with sufficient speed in order to enable a rapid and stable winding of the electric strip laminate 6 into a coil. It is thus possible to achieve a high coil stability and composite stability.

It is, however, also conceivable that before the winding, a cooling zone is provided to sufficiently cool down the electric strip laminate 6 in order to reduce the temperature of the electric strip laminate 6 to below 50° C. for example. This can improve the coil stability and composite stability.

In addition, the second electric strip 5, 500 also has a hot melt adhesive lacquer layer 11 on its flat side 52, According to the invention, before the electric strips 4, 5, 500 are pressed together, only the first hot melt adhesive lacquer 10 on the first electric strip 4 is thermally activated. Consequently, the second bot melt adhesive lacquer layer 11 is not heated, but rather at most, experiences secondary heating during the temperature equalization of the electric strips 4, 5 after the pressing process. In this way, it is possible to insure that the second hot melt adhesive lacquer layer 11 on the second electric strip 5, 500 is not activated and consequently remains still activatable and thus functional in this regard. To be specific, according to the invention, when the electric strips 4, 5, 500 are pressed together, this second hot melt adhesive lacquer layer 11 is situated on the flat side 52 of the second electric strip 5, 500 that faces away from the flat side 41 of the electric strip 4 with the activated hot melt, adhesive lacquer layer 10. This continuous strip method therefore produces an electric strip laminate 6 that can be subsequently used in the same way as is known for known electric strips with an activatable hot melt adhesive lacquer layer.

According to FIG. 1, the first hot melt adhesive lacquer 10 on the first electric strip 4 is thermally activated with the aid of a heating device 12 and then, between two rollers 13, is bonded to the flat side 51 of the second electric strip 5, 500.

According to FIG. 2, the flat side 51 of the second electric strip 5 is uncoated or is provided with a conversion layer that is not shown, which can be carried out by means of a chemical pretreatment in the continuous strip method. This chemical pretreatment, includes an application of polyvinyl alcohol.

FIG. 3 shows that a hot melt adhesive lacquer layer 9 is also provided on the flat side 51 of the second electric strip 500 that faces the flat side 41 of the electric strip 4. This can be beneficial for the integral bonding between the electric strips. Through the contact of this hot melt adhesive lacquer layer 9 with the first thermally activated, heated hot melt adhesive lacquer layer 10, the hot melt adhesive lacquer layer 9 on the second electric strip 500 is likewise thermally activated and the two hot melt adhesive lacquer layers 9, 10 are integrally bonded to form a combined hot melt adhesive lacquer layer 14. In particular, this thermal activation of the hot melt adhesive lacquer layer 9 on the second electric strip 500 occurs at the moment in which the two hot melt adhesive lacquer layers 9, 10 are pressed together. The temperature equalization of the electric strips 4, 500 in the bonded electric strip laminate 6 causes a rapid cooling of the hot melt adhesive lacquer layer 14 thus quickly enabling further processing of the electric strip laminate 6—without additional process steps. As in the exemplary embodiment according to FIG. 2, this insures that the hot melt adhesive lacquer layer 11 on the flat side 52 of the electric strip 500 is not thermally activated and remains functional for a subsequent activation. It is thus possible to insure, among other things, that the electric strip laminate 6 can already be wound into a coil 7 shortly or immediately after the pressing process.

In the continuous strip method described according to FIG. 1, cold rolled, non-grain-oriented electric strips 4, 5, 500 in the finally annealed state according to EN 10106/2007 were used. The electric strips 4, 5, 500 had a nominal thickness of 0.35 mm and nominal width of 1200 mm.

The same epoxy resin-based baking lacquer was used as the hot melt adhesive lacquer for the hot melt adhesive lacquer layers 9, 10, 11, which had a layer thickness of 0.01 mm. The activation temperature of all of the hot melt adhesive lacquer layers 9, 10, 11 was 150 to 200° C. In addition, fillers 15 with a particle size of 3.2 µm were added to the hot melt adhesive lacquer layers 9, 10 in order to improve the mechanical strength of the integral bonding.

The first electric strip 4 was heated with the heating unit 12 to 150 to 200° C., which thermally activated the hot melt adhesive lacquer layer 10.

The second electric strip 5, 500 was not actively heated, taut was supplied to the integral bonding process at the ambient temperature of 30° C.

Thanks to the comparatively high heat capacity of the second electric strip 5, 500, its second hot melt adhesive lacquer layer 11 was acted with a much lower temperature, namely approx. 70° C. which protected the second hot melt adhesive lacquer layer 11 from the thermal activation and also permitted the electric strip to be wound back into a coil comparatively quickly, preferably only after the electric strip laminate 6 has a temperature of less than 50° C. The strip travel speed in the continuous strip method was more than 20 in/min.

The electric strip laminate 6 produced according to the invention has a thickness of approx. 0.7 mm and a tensile shear strength of 5 MPa.

The invention claimed is:

1. A continuous strip method for producing an electric strip laminate which is wound into a coil, comprising:
   providing a first electric strip that is coated on at least one of its flat sides with a layer of a first thermally activatable hot melt adhesive lacquer;
   thermally activating the first thermally activatable hot melt adhesive lacquer on the first electric strip;
   providing a second electric strip that is coated on at least one of its flat sides with a layer of a second thermally activatable hot melt adhesive lacquer;
   pressing the first electric strip and the second electric strip against each other on their flat sides with the activated first hot melt adhesive lacquer layer between the flat sides of the first and second electric strips and with the second hot melt adhesive lacquer layer situated on the flat side of the second electric strip that faces away from the flat side of the first electric strip with the activated first hot melt adhesive lacquer layer, wherein the second electric strip is applied at a temperature below an activation temperature of the first hot melt adhesive lacquer on the first electric strip, and integrally bonding the first electric strip to the second electric strip to form an electric strip laminate; and
   winding the electric strip laminate into a coil.

2. The continuous strip method according to claim 1, comprising supplying the second electric strip to the pressing process at an ambient temperature in a range of 10 to 75° C.

3. The continuous strip method according to claim 1, comprising supplying the first electric strip to the pressing process heated at least to the activation temperature of the first hot melt adhesive lacquer.

4. The continuous strip method according to claim 1, wherein the first hot melt adhesive lacquer of the first electric strip is heated to 150 to 200° C. and thus thermally activated.

5. The continuous strip method according to claim 1, wherein the first activated hot melt adhesive lacquer layer is pressed against an adhesive-free flat side of the second electric strip.

6. The continuous strip method according to claim 1, wherein the flat side of the second electric strip is chemically pretreated and the activated first hot melt adhesive lacquer layer is pressed against this pretreated flat side of the second electric strip.

7. The continuous strip method according to claim 1, wherein on the flat side that faces the first electric strip, the second electric strip likewise has a layer of a third hot melt adhesive lacquer, which is thermally activated by a temperature of the first hot melt adhesive lacquer layer.

8. The continuous strip method according to claim 7, wherein on its flat side that faces the first electric strip, the third hot melt adhesive lacquer layer of the second electric strip is thermally activated during the pressing process.

9. The continuous strip method according to claim 7, wherein on the flat sides of the first and second electric strips that face each other, the first and third hot melt adhesive lacquer layers are supplied with fillers that have a particle size of 1 to 5 μm.

10. The continuous strip method according to claim 1, wherein as the first and second electric strips are being pressed together, the first and second electric strips are acted on by a compressive load of at least 17 N/cm.

11. The continuous strip method according to claim 1, comprising using a baking lacquer as the first hot melt adhesive lacquer and/or the second hot melt adhesive lacquer.

12. The continuous strip method according to claim 1, wherein the activation temperature of the first hot melt adhesive lacquer is the same as an activation temperature of the second hot melt adhesive lacquer.

13. The continuous strip method according to claim 1, wherein the first hot melt adhesive lacquer and the second hot melt adhesive lacquer are the same.

14. The continuous strip method according to claim 7, wherein the activation temperature of the first hot melt adhesive lacquer is the same as an activation temperature of the third hot melt adhesive lacquer.

15. The continuous strip method according to claim 7, wherein the first hot melt adhesive lacquer and the third hot melt adhesive lacquer are the same.

16. The continuous strip method according to claim 11, wherein the baking lacquer has an epoxy resin base.

17. The continuous strip method according to claim 7, comprising using a baking lacquer as the third hot melt adhesive lacquer.

18. The continuous strip method according to claim 17, wherein the baking lacquer has an epoxy resin base.

\* \* \* \* \*

UNITED STATES PATENT AND TRADEMARK OFFICE
CERTIFICATE OF CORRECTION

| | |
|---|---|
| PATENT NO. | : 11,090,920 B2 |
| APPLICATION NO. | : 15/998826 |
| DATED | : August 17, 2021 |
| INVENTOR(S) | : Ronald Fluch et al. |

Page 1 of 1

It is certified that error appears in the above-identified patent and that said Letters Patent is hereby corrected as shown below:

In the Specification

Column 6, Line 22, "in/min" should read --m/min--.

Signed and Sealed this
Fifteenth Day of March, 2022

Drew Hirshfeld
*Performing the Functions and Duties of the
Under Secretary of Commerce for Intellectual Property and
Director of the United States Patent and Trademark Office*